United States Patent
Roberts et al.

(10) Patent No.: US 12,300,813 B2
(45) Date of Patent: *May 13, 2025

(54) LMO CATHODE COMPOSITIONS

(71) Applicant: Dyson Technology Limited, Wiltshire (GB)

(72) Inventors: Matthew Robert Roberts, Oxford (GB); Niccolo Guerrini, Oxford (GB); Juliette Marie Billaud ep. Bouville, Oxford (GB)

(73) Assignee: Dyson Technology Limited, Malmesbury (GB)

(*) Notice: Subject to any disclaimer, the term of this patent is extended or adjusted under 35 U.S.C. 154(b) by 510 days.

This patent is subject to a terminal disclaimer.

(21) Appl. No.: 17/769,964

(22) PCT Filed: Oct. 21, 2020

(86) PCT No.: PCT/GB2020/052638
§ 371 (c)(1),
(2) Date: Apr. 18, 2022

(87) PCT Pub. No.: WO2021/079103
PCT Pub. Date: Apr. 29, 2021

(65) Prior Publication Data
US 2022/0367867 A1    Nov. 17, 2022

(30) Foreign Application Priority Data
Oct. 22, 2019 (GB) ...................... 1915242

(51) Int. Cl.
*H01M 4/505* (2010.01)
*C01G 45/1228* (2025.01)
(Continued)

(52) U.S. Cl.
CPC ........ *H01M 4/505* (2013.01); *C01G 45/1228* (2013.01); *H01M 4/623* (2013.01);
(Continued)

(58) Field of Classification Search
CPC ...... H01M 4/505; H01M 4/623; H01M 4/625; H01M 10/0525; H01M 2004/028;
(Continued)

(56) References Cited

U.S. PATENT DOCUMENTS

| 5,240,794 A | 8/1993 | Thackeray et al. |
| 5,747,194 A | 5/1998 | Davidson et al. |

(Continued)

FOREIGN PATENT DOCUMENTS

| CN | 1886343 A | 12/2006 |
| CN | 107925080 A | 4/2018 |

(Continued)

OTHER PUBLICATIONS

Machine Translation of JP-2001302244-A (Oct. 16, 2024) (Year: 2024).*

(Continued)

*Primary Examiner* — Matthew J Merkling
(74) *Attorney, Agent, or Firm* — Tucker Ellis LLP (57) ABSTRACT

A cathode composition for a lithium-ion cell or battery of the general formula: $Li_{1+x}Mn_{1-x}O_2$, wherein the composition is in the form of a single phase having a rock salt crystal structure; and the value of x is greater than 0, and equal to or less than 0.3. The compound is also formulated into a positive electrode, or cathode, for use in an electrochemical cell.

16 Claims, 6 Drawing Sheets

(51) Int. Cl.
 H01M 4/02 (2006.01)
 H01M 4/62 (2006.01)
 H01M 10/0525 (2010.01)

(52) U.S. Cl.
 CPC ....... *H01M 4/625* (2013.01); *H01M 10/0525* (2013.01); *C01P 2002/50* (2013.01); *C01P 2002/72* (2013.01); *C01P 2002/76* (2013.01); *C01P 2006/40* (2013.01); *H01M 2004/028* (2013.01)

(58) Field of Classification Search
 CPC ............ C01G 45/1257; C01G 45/1228; C01P 2002/72; C01P 2002/76
 See application file for complete search history.

(56) References Cited

U.S. PATENT DOCUMENTS

| | | | |
|---|---|---|---|
| 6,193,947 | B1 | 2/2001 | Tabuchi et al. |
| 9,865,872 | B2 | 1/2018 | Nakahara et al. |
| 9,960,417 | B2 | 5/2018 | Ceder et al. |
| 10,573,889 | B2 | 2/2020 | Thackeray et al. |
| 10,608,248 | B2 | 3/2020 | Kawakami et al. |
| 2005/0135993 | A1* | 6/2005 | Xu .................... C01G 45/1228 423/605 |
| 2007/0202407 | A1 | 8/2007 | Eberman et al. |
| 2010/0112448 | A1 | 5/2010 | Yu et al. |
| 2012/0282526 | A1 | 11/2012 | Yasuda et al. |
| 2014/0099549 | A1* | 4/2014 | Ceder .................. H01M 4/624 429/231.95 |
| 2016/0218364 | A1 | 7/2016 | Sakai et al. |
| 2017/0244104 | A1 | 8/2017 | Natsui et al. |
| 2018/0183058 | A1* | 6/2018 | Idemoto ................ H01M 4/505 |
| 2019/0088940 | A1* | 3/2019 | Ceder .................... C01G 53/44 |
| 2022/0367866 | A1 | 11/2022 | Ceder et al. |
| 2022/0384799 | A1 | 12/2022 | Roberts et al. |

FOREIGN PATENT DOCUMENTS

| | | | |
|---|---|---|---|
| JP | 2615854 | B2 | 6/1997 |
| JP | 2001302244 | A * | 10/2001 |
| JP | 4997609 | B2 | 8/2012 |
| JP | 2013012336 | A | 1/2013 |
| JP | 2013-252995 | A | 12/2013 |
| JP | 5657970 | B2 | 1/2015 |
| JP | 5741371 | B2 | 7/2015 |
| JP | 5895730 | B2 | 3/2016 |
| KR | 10-1910884 | B1 | 10/2018 |
| WO | 2019/087717 | A1 | 5/2019 |
| WO | 2019/091667 | A1 | 5/2019 |

OTHER PUBLICATIONS

Idemoto et al., "Properties, Crystal Structure, and Performance of o-LiMnO[sub 2] as Cathode Material for Li Secondary Batteries", Journal Of The Electrochemical Society, vol. 153, No. 2, 2006, pp. A418-A424.
International Search Report and Written Opinion received for PCT Patent Application No. PCT/GB20/052642, mailed on Mar. 12, 2021, 12 pages.
International Search Report and Written Opinion received for PCT Patent Application No. PCT/GB2020/052638, mailed on Mar. 12, 2021, 11 pages.
Radin et al., "Manganese oxidation as the origin of the anomalous capacity of Mncontaining Li-excess cathode materials", Nature Energy, vol. 4, 2019, pp. 639-646.
Sato et al., "Metastable and nanosize cation-disordered rocksalt-type oxides: revisit of stoichiometric LiMnO 2 and NaMnO 2", Journal Of Mater1Als Chemistry A, vol. 6, No. 28, 2018, pp. 13943-13951.
Search Report received for Great Britain Patent Application No. 1915242.0, mailed on Apr. 22, 2020, 1 page.
Search Report received for Great Britain Patent Application No. 1915244.6 , mailed on Apr. 22, 2020, 1 page.
Thackery et al., "Comments on the structural complexity oflithium-rich Li1+xM1—xO2 electrodes (M=Mn, Ni, Co) for lithium batteries", Electrochem Comm., vol. 8, 2006, pp. 1531-1538.
Uyama et al., "High-pressure synthesis and electrochemical properties of tetragonal LiMnO 2", RSC Advances, vol. 8, No. 46, 2018, pp. 26325-26334.
International Preliminary Report on Patentability received for PCT Patent Application No. PCT/GB2020/052638, mailed on May 5, 2022, 7 pages.
International Preliminary Report on Patentability received for PCT Patent Application No. PCT/GB2020/052642, mailed on May 5, 2022, 8 pages.
Office Action received for Chinese Patent Application No. 202080073225.3, mailed on Dec. 7, 2023, 7 pages of Original Document Only.
Soo Kim et al., "Synthesis of layered-layered xLi2MnO3 (1-x)LiMO2 (M=Mn, Ni, Co) nanocomposite electrodes materials by mechanochemical process", Journal of Power Sources 220, 2012, pp. 422-429.
Huanya Qi et al., "Preparation and Processing of Photovoltaic Materials", Northwestern Polytechnical University Press, p. 5.
Shiqing Xu et al., "Basis of Material Science", Fundamentals of Materials Science, Shanghai Jiaotong University Press, 2015, p. 50.
International Search Report and Written Opinion received for PCT Patent Application No. PCT/GB2020/052639, mailed on Feb. 24, 2021, 9 pages.
Jun Sugiyama et al., "A new variety of LiMnO2: high-pressure synthesis and magnetic properties of tetragonal and cubic phases of LixMn1—xO (x-0.5)", Materials Science and Engineering B84, 2001-0305, 224-232.

* cited by examiner

FIG. 7

LMO CATHODE COMPOSITIONS

CROSS-REFERENCE TO RELATED APPLICATIONS

This application is the National Stage of International Application No. PCT/GB2020/052638 filed Oct. 21, 2020, and claims benefit of United Kingdom Application No. 1915242.0 filed Oct. 22, 2019, each of which are herein incorporated by reference in their entirety.

TECHNICAL FIELD

The present invention relates to a set of electroactive lithium-rich manganese cathode compositions having a rock salt structure. More specifically the present invention relates to a set of high capacity lithium-rich manganese oxide cathode compositions which can be used as bulk or composite cathode material in an electrochemical cell.

BACKGROUND

The performance and cost of lithium ion batteries primarily relies on the composition of the positive electrode (cathode). Currently available lithium-based cathode compositions are graded mainly on their energy density, electrochemical performance and the price of raw materials required to formulate the composition. Manganese would be an ideal sole-transition metal centre for a lithium-based cathode composition, as the abundance of manganese in the Earth's crust is far greater than cobalt and nickel. Although much higher capacities and energy densities can currently be achieved with compositions comprising nickel, cobalt and aluminium, the cost of these metals is far greater. In addition, these nickel, cobalt and aluminium-based composition still suffer with problems of the voltage profile evolving on cycling, costly (because of the inclusion of cobalt and nickel) and show significant stability issues, such as gas loss during cycling. There is a need for a simple, robust and cost-effective lithium-rich material which delivers parity or better in terms of energy density and performance.

SUMMARY

In a first aspect, the present invention provides a cathode composition for a lithium-ion battery of the general formula: $Li_{1+x}Mn_{1-x}O_2$; wherein the composition is in the form of a single phase having a rock salt crystal structure; and the value of x is greater than 0, and equal to or less than 0.3.

Conventional ordered or layered lithium and manganese-rich compositions ($Li_{1+x}Tm_{1-x}O_2$ where Tm is predominately Mn) have lithium ions sitting in both the alkali and transition metal sites. This is compared to an ideal $LiCoO_2$ R3/m type structure, where lithium and cobalt ions fully occupy alternating layers within the structure.

It has been found that a cathode composition with an improved stability and capacity performance can be achieved by the lithium-rich manganese oxide compositions as defined above. The cathode compositions of the present invention also exhibit improved electrochemical cycling when compared to the traditional layered lithium manganese oxide structures of the prior art.

In particular, the compositions are provided as a single phase rock salt crystal structure (i.e. face centred cubic lattice with the Fm3(bar)m space group). The specifically identified compounds can be manufactured reproducibly at a high rate using conventional ball-milling techniques by mixing $LiMnO_2$ and $Li_2MnO_3$ precursors in different proportions. In addition, other conventional techniques can be used to manufacture a thin film of the cathode composition, such as PVD techniques including, but not limited to sputtering and sublimation/evaporation of target material.

In specific examples, the value of x may be equal to or greater than 0.1. The value of x may be equal to or greater than 0.17. The value of x may be equal to or greater than 0.2. The value of x may be equal to or greater than 0.2 and equal to or less than 0.3. The value of x may be equal to or greater than 0.1 and equal to or less than 0.2. The value of x may be equal to 0.2.

In a particular example, x is equal to 0.2. This particular composition is thus $Li_{1.2}Mn_{0.8}O_2$. This particular composition has demonstrated an improved capacity for charge, and stability over a number of cycles.

The composition may be expressed as the general formula: $(a)LiMnO_2 \cdot (1-a)Li_2MnO3$; wherein two precursors are provided in proportions defined by a, and a has a value in the range greater than 0 and less than 1; and the precursors are mixed by a ball milling process to provide a bulk composition with a rock salt structure. In examples a has a value in the range greater than 0.05 and less than 0.95

In specific examples, the value of a may be equal or greater than 0.15 and equal to or less than 0.7. The value of a may be equal to or greater than 0.15 and equal to or less than 0.4. As shown in the Examples of the present invention below, the cathode composition may be selected from one of 0.7LiMnO2·0.3Li2MnO3; 0.6LiMnO2·0.4Li2MnO3; 0.5LiMnO2·0.5Li2MnO3; 0.4LiMnO2·0.6Li2MnO3; 0.3LiMnO2·0.7Li2MnO3; 0.2LiMnO2·0.8Li2MnO3; 0.15LiMnO2·0.85Li2MnO3; $0.4LiMnO_2 \cdot 0.6Li_2MnO_3$.

In a second aspect, the present invention provides a cathode (or more generally an electrode). The cathode can be made with the cathode composition as a thin film as part of a PVD technique, or alternatively the cathode can be made using the cathode composition as cathode active in a composite electrode.

In examples, a cathode comprising cathode material of the present invention comprises 3 fractions. The first is the compound of the present invention as previously described (in a variety of mass percentages from 60-98%, however, typically 70, 75, 80, 90 and 95%). The second fraction of the cathode comprises electroactive additives such as carbon, for example, Super P and Carbon black, which comprises 60-90% of the mass fraction remaining excluding the first fraction. The third fraction is typically a polymeric binder such as PVDF, PTFE, NaCMC and NaAlginate. In some case additional fractions maybe included and the overall percentages may change. The overall electrochemical performance of the cathode can be improved by the introduction of electroactive additives, and the structural properties of the resulting cathode can also be improved by adding material that improves cohesion of the cathode composition and adhesion of the material to particular substrates.

In a third aspect, the present invention provides an electrochemical cell comprising a cathode according to the description above, an electrolyte and an anode. The electrolyte may, for example, take the form of a liquid or solid, such as a gel or a ceramic.

BRIEF DESCRIPTION OF FIGURES

In order that the present invention may be more readily understood, an embodiment of the invention will now be described, by way of example, with reference to the accompanying Figures, in which.

DETAILED DESCRIPTION

The present invention will now be illustrated with reference to the following examples.

Example 1—Synthesis of the Lithium Rich Manganese Oxide Materials

Material comprising $LiMnO_2$ and $Li_2MnO_3$ precursors were mixed in different molar proportions in accordance with Table 1 using WC jars and balls. All materials were handled at all times under inert atmosphere (in an Argon filled glovebox) and never exposed to ambient atmosphere, ie protected against moisture and oxygen at all times. A planetary ball milling (Fritsch Planetary Micro Mill PULVERISETTE 7 premium line which can deliver energy which are approximately 150% above that which can be achieved through conventional milling) was employed and the milling was performed at a speed rate of 700 rpm for 10 minutes, following 30 minutes break. Phase purity was assessed after repeating this milling and resting cycle for at least 30 times, i.e. for a total milling time of at least 5 hours. However, it is possible that less milling times are necessary to achieve phase purity. The phase transformation is assessed by X-ray diffraction. If the phase transformation is not complete, the same program is repeated, and so on.

| $LiMnO_2$ | $Li_2MnO_3$ | Resulting Composition | Stoichiometry |
|---|---|---|---|
| 0.7 | 0.3 | $0.7LiMnO_2 \cdot 0.3Li_2MnO_3$ | $Li_{1.1}Mn_{0.9}O_2$ |
| 0.6 | 0.4 | $0.6LiMnO_2 \cdot 0.4Li_2MnO_3$ | $Li_{1.13}Mn_{0.87}O_2$ |
| 0.5 | 0.5 | $0.5LiMnO_2 \cdot 0.5Li_2MnO_3$ | $Li_{1.17}Mn_{0.83}O_2$ |
| 0.4 | 0.6 | $0.4LiMnO_2 \cdot 0.6Li_2MnO_3$ | $Li_{1.2}Mn_{0.8}O_2$ |
| 0.3 | 0.7 | $0.3LiMnO_2 \cdot 0.7Li_2MnO_3$ | $Li_{1.23}Mn_{0.77}O_2$ |
| 0.2 | 0.8 | $0.2LiMnO_2 \cdot 0.8Li_2MnO_3$ | $Li_{1.27}Mn_{0.73}O_2$ |
| 0.15 | 0.85 | $0.15LiMnO_2 \cdot 0.85Li_2MnO_3$ | $Li_{1.28}Mn_{0.72}O_2$ |

Figure 2:
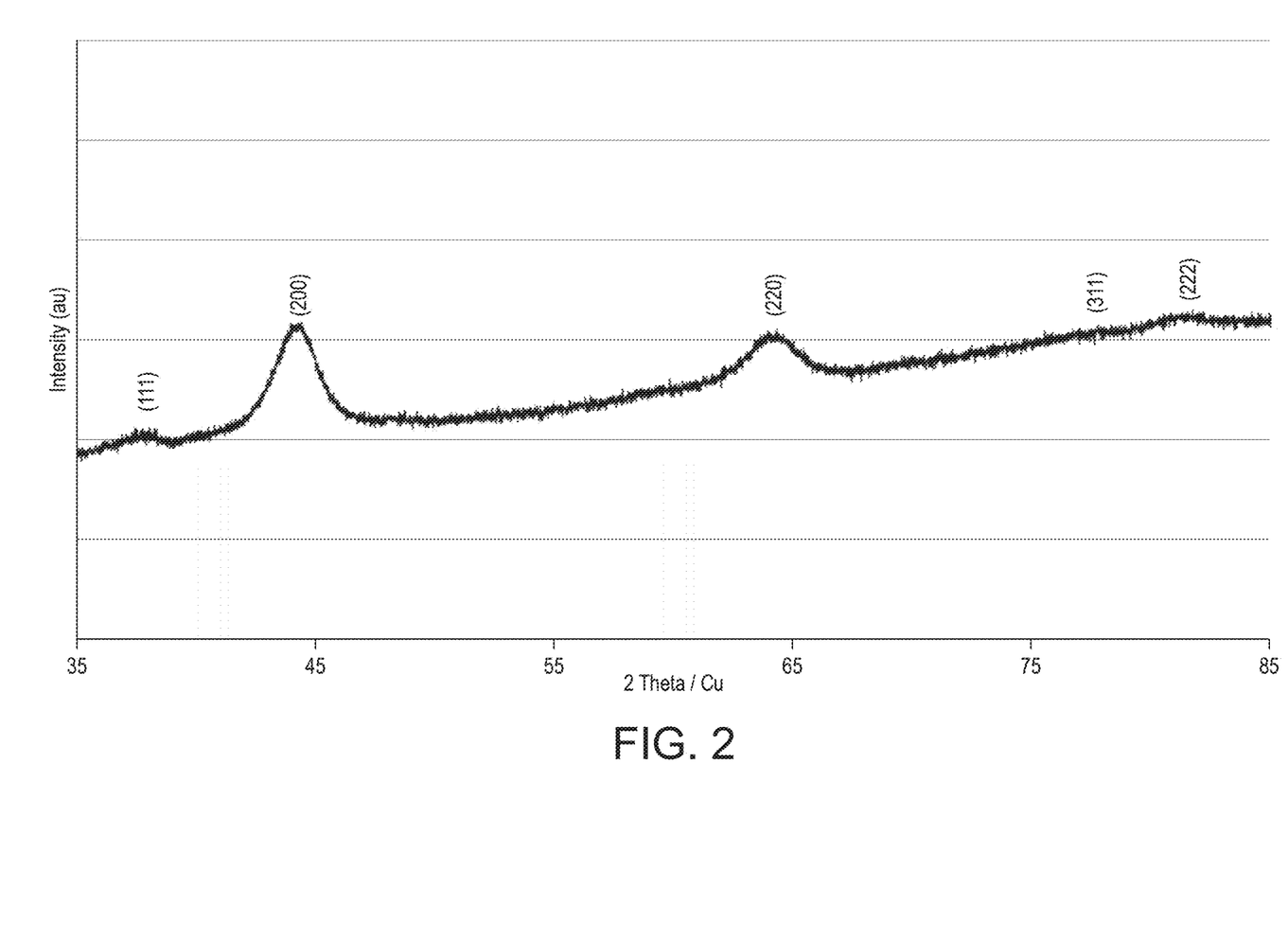
FIG. 2 shows powder X-ray Diffraction patterns of the synthesised materials $Li_{1.2}Mn_{0.8}O_2$ (or $0.4LiMnO_2 \cdot 0.6Li_2MnO_3$) compound in Example 1.
Figure 3A:
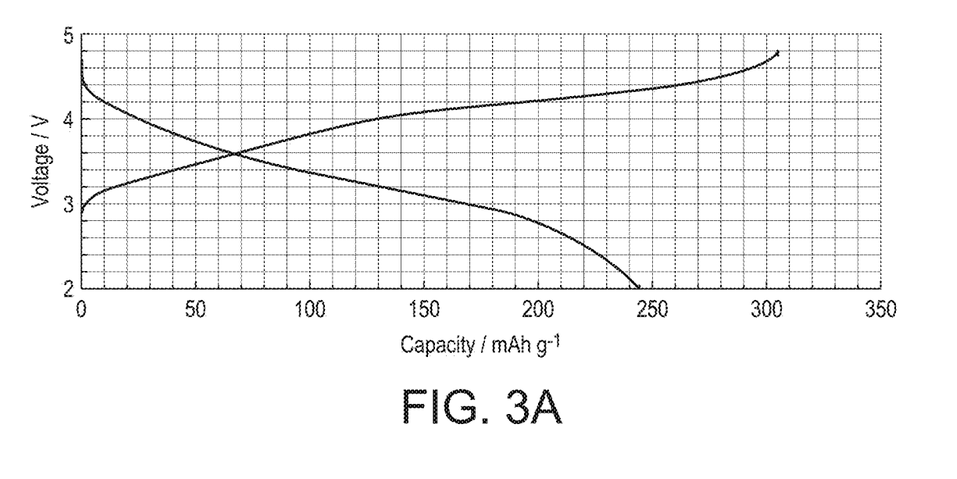
FIGS. 3a and b shows first cycle galvanostatic load curves for the first cycle of $Li_{1.2}Mn_{0.8}O_2$ and $Li_{1.1}Mn_{0.9}O_2$ at 45° C. at C/10 respectively, and FIGS. 3c and d show evolution of the charge and discharge capacity as a function of cycle for $Li_{1.2}Mn_{0.8}O_2$ and $Li_{1.1}Mn_{0.9}O_2$ respectively.
Figure 3B:
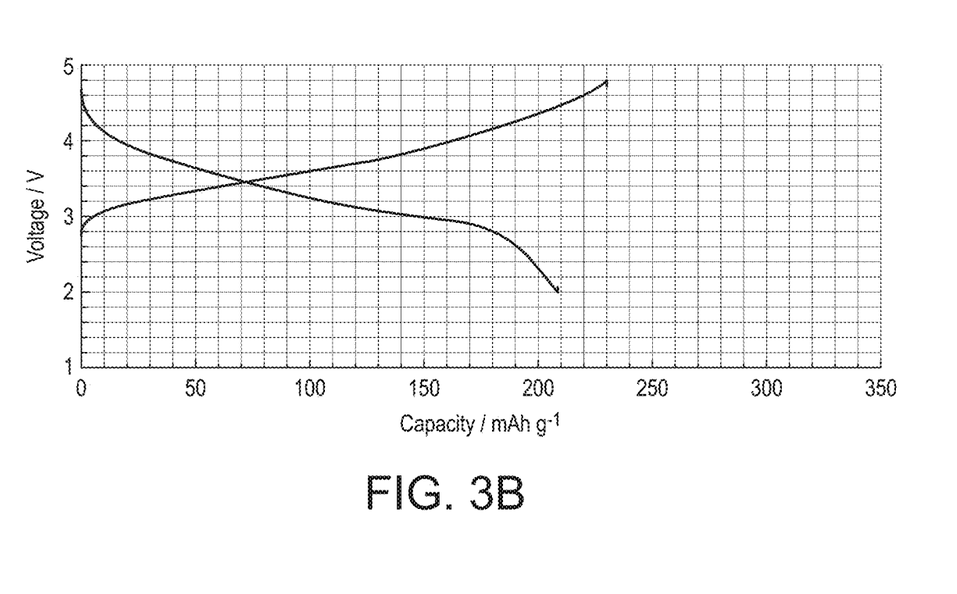
Figure 3C:
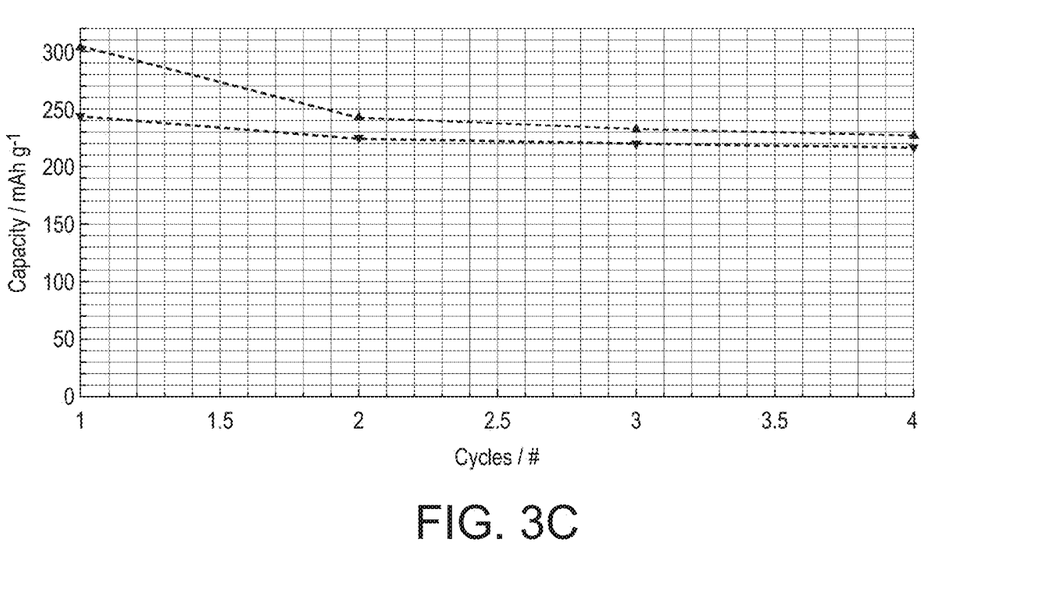
Figure 3D:
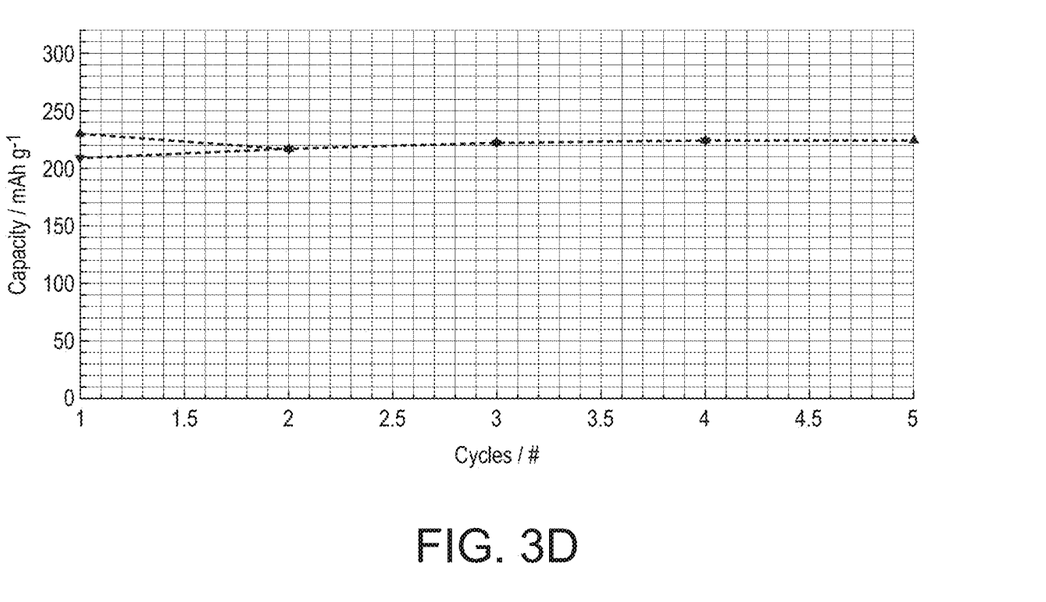

Alternate starting materials can be used here including but not limited to $Mn_2O_3$, $MnO_2$, $Li_2O$, $Li_2O_2$, $Mn_2O_4$, $LiMn_2O_4$. An addition route for the preparation of $Li_{1.2}Mn_{0.8}O_2$ was tried with $Li_2O$, $Mn2O3$ and $MnO2$ which resulted in the same phase as shown in FIG. 2.

Figure 4:
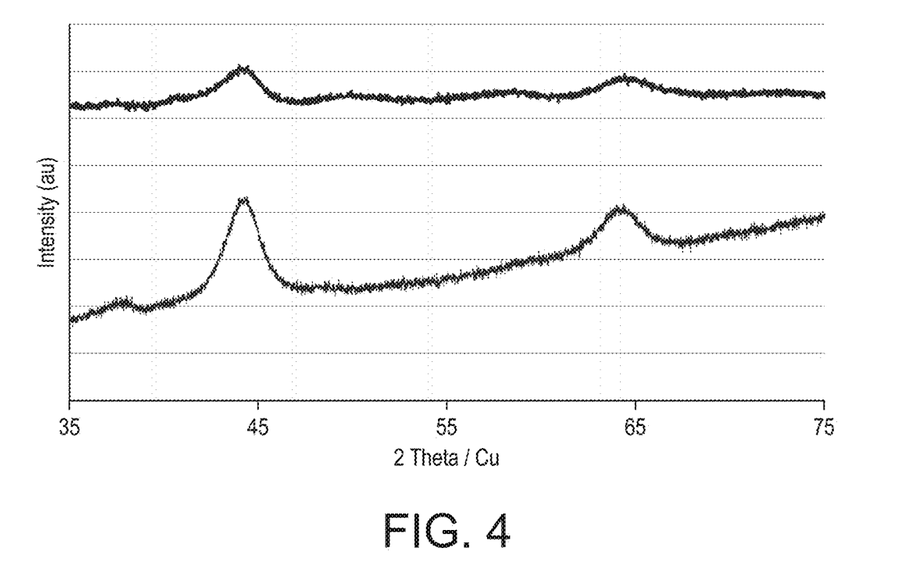
FIG. 4 shows preparation of $Li_{1.2}Mn_{0.8}O_2$ with a conventional planetary ball mill at 400 rpm with $ZrO_2$ balls (upper line) compared to the high energy ball mill with 700 rpm and WC balls (lower line)
Figure 5:
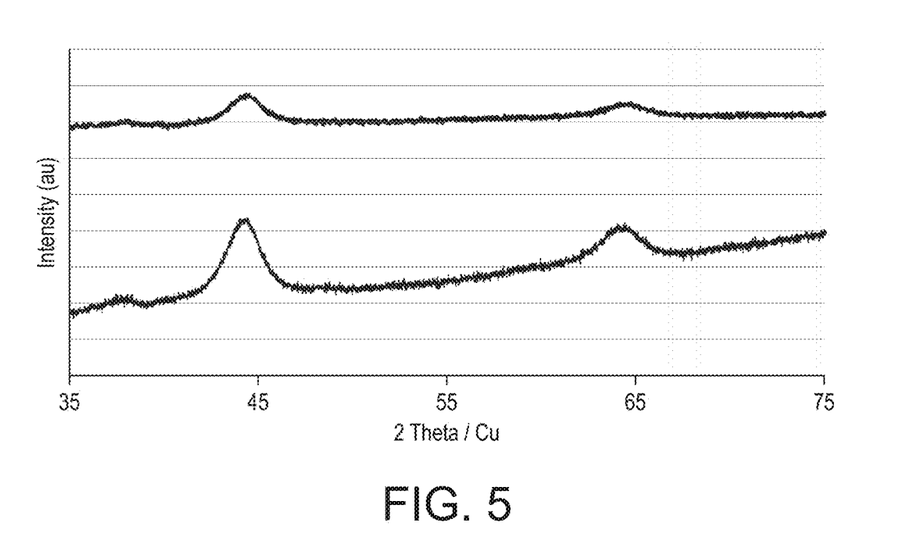
FIG. 5 shows preparation of $Li_{1.2}Mn_{0.8}O_2$ with starting materials $Li_2MnO_3$, $Li_2O_2$ and $Mn_2O_3$ (upper line) compared to starting materials $Li_2MnO_3$ and $LiMnO_2$ (lower line)
Figure 6:
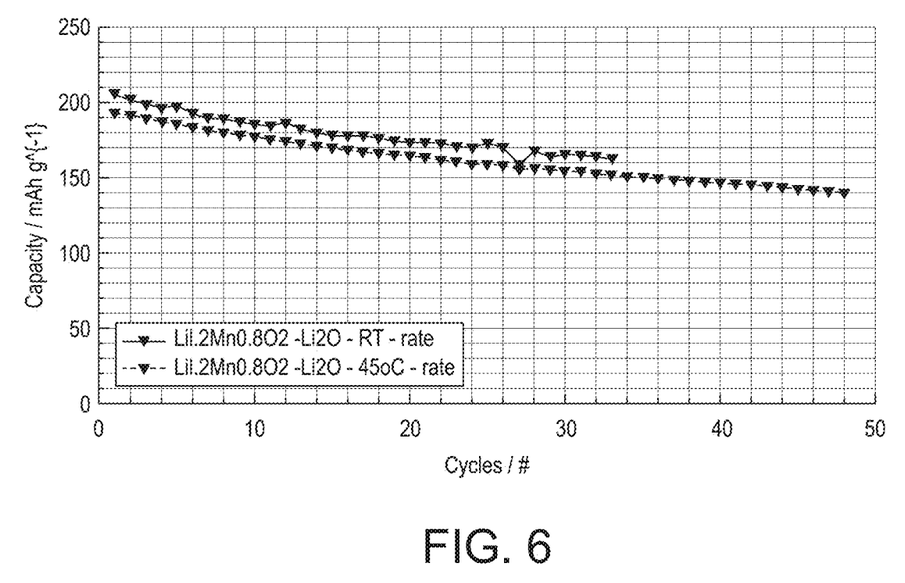
FIG. 6 shows Electrochemical data of $Li_{1.2}Mn_{0.8}O_2$ prepared from $Li_2MnO_3$, $Li_2O_2$ and $Mn_2O_3$ with C/10 charge, and C/5 discharge.

Alternatively a conventional planetary ball mill was used, the Retsch PM 100 mill. Here both mills were used to prepare $Li_{1.2}Mn_{0.8}O_2$ at a milling speed of 400 rpm with $ZrO_2$ balls. Here it can be clearly understood that the lower density of the milling media and the rotation rate will result in significantly lower energy collisions. The conditions employed by both mills were successful in obtaining the disordered rock salt phase (FIG. 4) with a composition of $Li_{1.2}Mn_{0.8}O_2$ indicating that preparation at high energies is not the only route to material production.

Alternatively, mechanofusion or conventional Physical Vapour Deposition techniques can be considered to prepare these cathode compositions.

Example 2—Structural Analysis and Characterisation of the Lithium Rich Manganese Oxide Materials The materials according to Example 1 were examined with Powder X-Ray Diffraction (PXRD) which was carried out utilising a Panalytical Aeris benchtop XRD with a Cu Kα Radiation. The range of measurement was 10-90 ° 2 theta.

Figure 1:
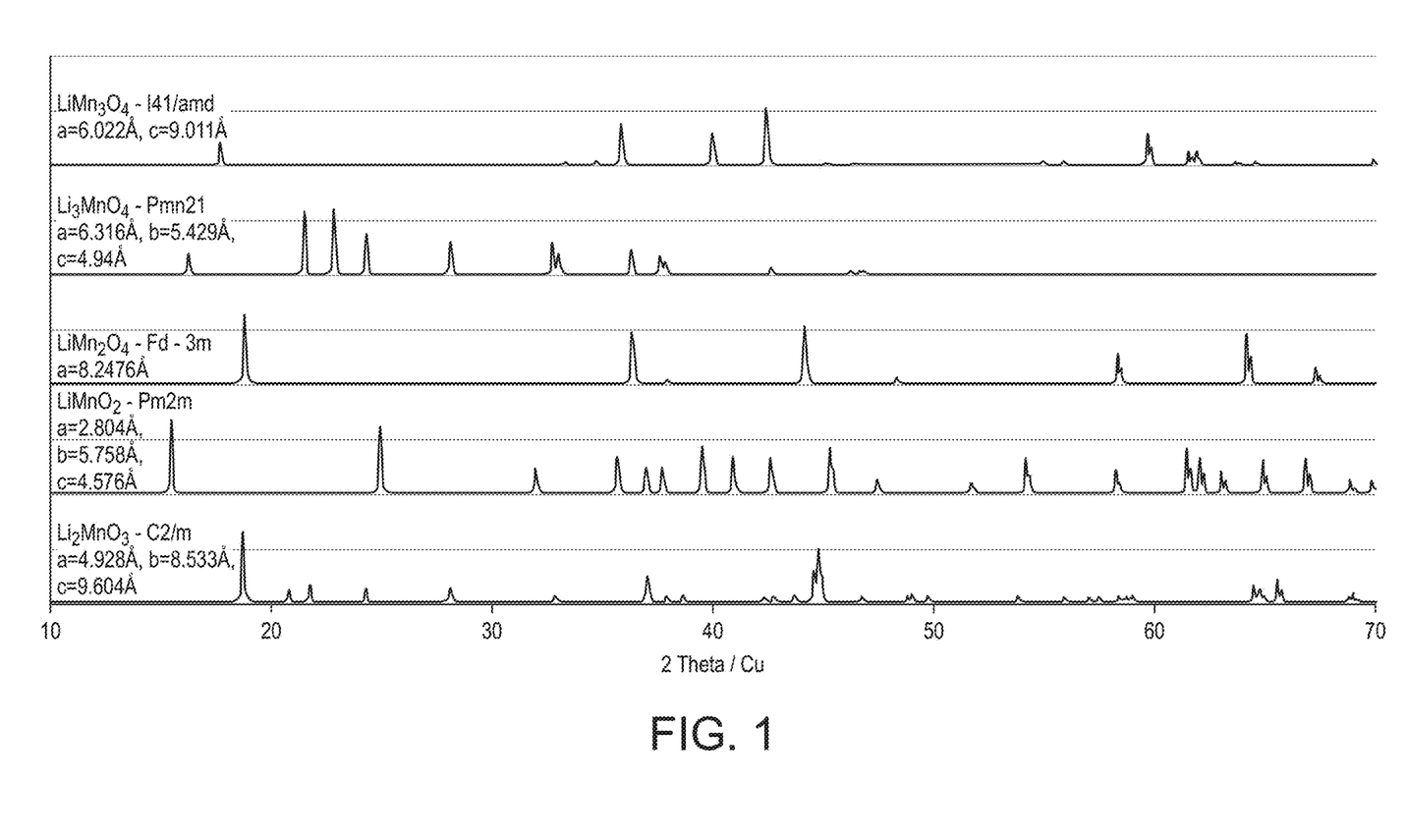
FIG. 1 shows powder X-ray Diffraction patterns of various Li—Mn—O compounds that exist, with their space groups and lattice parameters.
Figure 7:
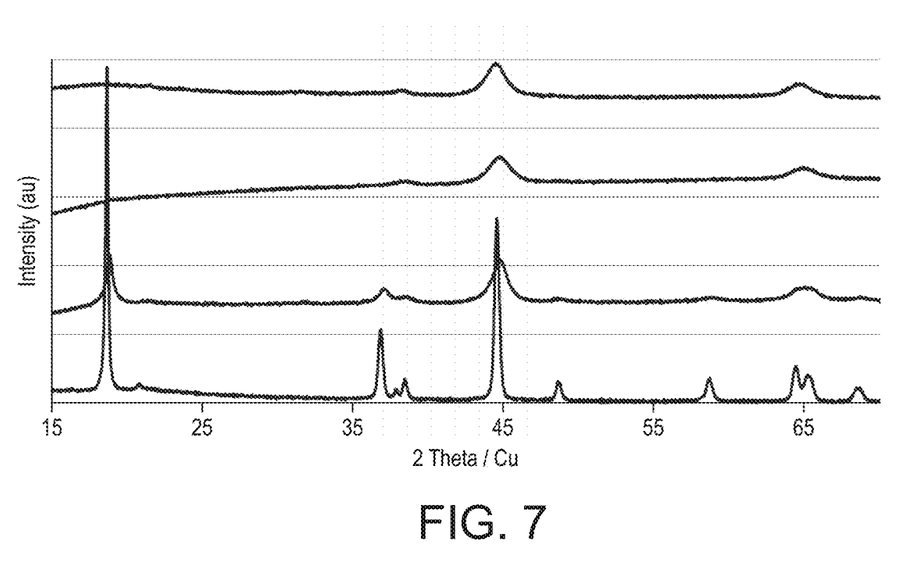
FIG. 7 shows X-ray diffraction patterns of the precursors (lower line), ball milled for 40 min (second to lower line), ball milled for 5 h (second to higher line) and ball milled for 10 h (higher line).

FIG. 2 shows a representative Powder X-ray Diffraction pattern of the synthesised compositions. These are characteristic of a cation disordered rock salt structure. All of the patterns appear to show the broad major peaks consistent with a face centred cubic lattice with the Fm3(bar)m space group, as shown in FIG. 2. It should be noted that broad peaks are displayed due to the ball milling process which without wishing to be bound by theory results in a material with a small crystallite size. There is no evidence for the presence of the layered precursors which had a layered $LiMnO_2$ or $Li_2MnO_3$ structures with the space group R3(bar)m or C2/m, which would indicate that the ball-milling synthesis has converted the material of the precursors into the composition of the present inventions. No presence of extra peaks due to impurities was observed. The example XRD in FIG. 2 shown for $Li_{1.2}Mn_{0.8}O_2$ was indicative of all samples with a slight shifting of the peak positions in accordance with changes to the bulk lattice parameters as a result of the changing composition. It should also be noted that no crystalline phases for other common $Li_pMn_jO_q$ (database patterns shown in FIG. 1 for comparison) materials can be seen in the final product. FIG. 7 also shows how the reaction proceeds as the initial precursors are slowly removed on continual milling as the disordered rock salt phase becomes the dominant feature.

Example 3—Electrochemical Analysis of the Lithium Rich Manganese Oxide Materials The materials according to Example 1 were characterised electrochemically through galvanostatic cycling performed with a BioLogic BCS series potentiostats. All the samples were assembled as powdered cathodes into Swagelok type cells with a metallic lithium counter/reference electrode and cycled between 2 and 4.8 V vs. $Li^+/Li$ at a current rate of C/10 as defined by a capacity of 300 mAh/g. The electrolyte employed was LP40 (a 1M solution of $LiPF_6$ in 1:1 w/w ratio of EC;DEC).

FIGS. 3a-d shows the potential curves during the charge and subsequent discharge of the first cycle for compositions $0.7LiMnO_2 \cdot 0.3Li_2MnO_3$ and $0.4LiMnO_2 \cdot 0.6Li_2MnO_3$ according to Example 1. Both samples present high discharge capacities above 200 mAh/g at C/10. The values of the first discharge capacities for all materials which have been prepared are detailed in the Table below.

The 0.4LiMnO$_2$·0.6Li$_2$MnO$_3$ compound exhibits a sloping region at the beginning of charge, until ca. 4 V vs Li+/Li and a high potential plateau centred at around 4.2 V vs Li+/Li that appears to be irreversible on the first discharge. This general feature could be considered consistent for all the prepared materials with Li>1.1 per formula unit with the length of the plateau correlating to the amount of lithium in the material: the more lithium is present the longer the plateau.

The 0.7LiMnO$_2$·0.3Li$_2$MnO$_3$ compound exhibits a different first charge. A long sloping region is observed up to the high potential cut-off of 4.8 V vs Li+/Li. No potential plateau is observed, less irreversibility on discharge is seen and therefore a higher first cycle coulombic efficiency.

| | Phase purity | First charge capacity (mAh/g) | First discharge capacity (mAh/g) | Coulombic efficiency at the first cycle |
|---|---|---|---|---|
| 0.7LiMnO2·0.3Li2MnO3 | No crystalline phase detectable except rock-salt structure (Fm3(bar)m) | 230 | 209 | 90.8% |
| 0.6LiMnO2·0.4Li2MnO3 | No crystalline phase detectable except rock-salt structure (Fm3(bar)m) | 279.5 | 249.6 | 89.3% |
| 0.5LiMnO2·0.5Li2MnO3 | No crystalline phase detectable except rock-salt structure (Fm3(bar)m) | 281 | 250 | 88.9% |
| 0.4LiMnO2·0.6Li2MnO3 | No crystalline phase detectable except rock-salt structure (Fm3(bar)m) | 315.9 | 245.3 | 77.7% |
| 0.3LiMnO2·0.7Li2MnO3 | No crystalline phase detectable except rock-salt structure (Fm3(bar)m) | 317.8 | 264 | 83.1% |
| 0.2LiMnO2·0.8Li2MnO3 | No crystalline phase detectable except rock-salt structure (Fm3(bar)m) | 346.2 | 239.6 | 69.2 |
| 0.15LiMnO2·0.85Li2MnO3 | No crystalline phase detectable except rock-salt structure (Fm3(bar)m) | 376.9 | 242.9 | 64.4% |

The invention claimed is:

1. A cathode composition for a lithium-ion battery of the general formula:

$$Li_{1+x}Mn_{1-x}O_2$$

wherein the composition is in the form of a single phase having a rock salt crystal structure exhibiting the Fm3(bar)m space group; and the value of x is greater than 0, and equal to or less than 0.3.

2. The cathode composition according to claim 1, wherein the value of x is equal to or greater than 0.1.

3. The cathode composition according to claim 1, wherein the value of x is equal to or greater than 0.17.

4. The cathode composition according to claim 1, wherein the value of x is equal to or greater than 0.2.

5. The cathode composition according to claim 1, wherein the value of x is equal to or greater than 0.2 and equal to or less than 0.3.

6. The cathode composition according to claim 1, wherein the value of x is equal to or greater than 0.1 and equal to or less than 0.2.

7. The cathode composition according to claim 1, wherein the value of x is equal to 0.2.

8. The cathode composition according to claim 1, wherein the composition is prepared by a ball milling process of two precursors, LiMnO$_2$ and Li$_2$MnO$_3$, and the composition is expressed as the general formula of the two precursors:

LiMnO$_2$·(1−a)Li$_2$MnO3 (a)

wherein the two precursors are provided in proportions defined by a, and a has a value in the range greater than 0, and less than 1.

9. The composition according to claim 8, wherein the value of a is equal or greater than 0.15 and equal to or less than 0.7.

10. The composition according to claim 8, wherein the value of a is equal or greater than 0.15 and equal to or less than 0.4.

11. The composition according to claim 8, wherein the material is 0.4LiMnO$_2$·0.6Li$_2$MnO$_3$.

12. An electrode comprising the cathode composition according to claim 1.

13. The electrode according to claim 12, wherein the electrode comprises electroactive additives and/or a binder.

14. The electrode according to claim 13, wherein the electroactive additive is selected from at least one of carbon or carbon black.

15. The electrode according to claim 13, wherein the polymeric binder is selected from at least one of PVDF, PTFE, NaCMC or NaAlginate.

16. An electrochemical cell comprising a cathode according to the electrode according to claim 12, an electrolyte, and an anode.

* * * * *